H. GINNEL.
MASSAGE APPARATUS.
APPLICATION FILED JUNE 12, 1908.
908,855.
Patented Jan. 5, 1909.
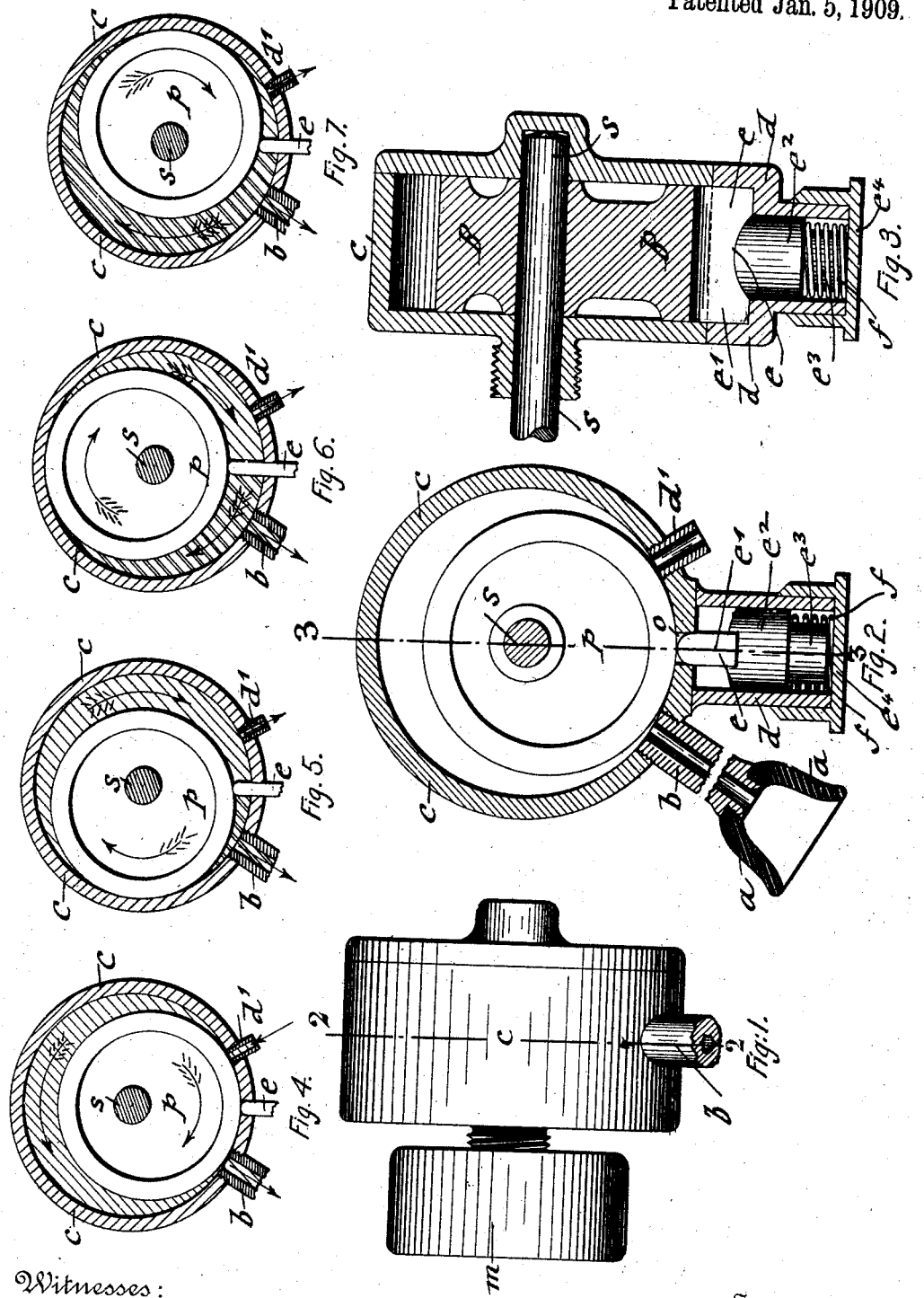

UNITED STATES PATENT OFFICE.

HENRY GINNEL, OF GARDEN CITY, NEW YORK.

MASSAGE APPARATUS.

No. 908,855.

Specification of Letters Patent.

Patented Jan. 5, 1909.

Application filed June 12, 1908. Serial No. 438,026.

*To all whom it may concern:*

Be it known that I, HENRY GINNEL, a citizen of the United States of America, residing at Garden City, in the county of Nassau and State of New York, have invented certain new and useful Improvements in Massage Apparatus, of which the following is a specification.

This invention relates to an improved massage apparatus in which a cup-shaped appliance known as the vibrator, which is usually made of soft rubber, is vibrated so as to give short, quick blows to the fleshy parts and which simultaneously produces a quickly repeated suction-action on the fleshy parts so as to alternately raise and release the same and impart thereby a kneading action to the same; and for this purpose the invention consists of a massage apparatus which comprises a cylindrical casing, an eccentric piston rotating therein, a spring-actuated abutment placed in contact with the piston and extending through an opening into the casing, said piston being driven by an electric or other motor, and a vibrator connected with the casing at one side of the abutment, while an air-nipple is located at the other side so that in connection with the blows imparted by the action of the piston a suction or kneading action is exerted on the parts to be massaged, as will be fully described hereinafter and finally pointed out in the claims.

In the accompanying drawings, Figure 1 represents a side-elevation of my improved massage-apparatus, Fig. 2 is a vertical longitudinal section of the same on line 2, 2, Fig. 1, Fig. 3 is a vertical transverse section on line 3, 3, Fig. 2, and Figs. 4–7 are diagrammatic sections through the casing showing the different positions of the piston during one rotation of the same.

Similar letters of reference indicate corresponding parts throughout the figures.

The improved massage apparatus consists of three main-parts: an actuating mechanism which comprises a portable cylindrical casing $c$, an eccentric piston $p$ in the same, and an electric or other motor $m$ placed on the shaft $s$ of the piston for driving the same; a spring-actuated abutment $e$, which is located in a cylindrical socket $d$ at one point of the casing; and a vibrator $a$, which is connected by a flexible tube $b$ with the casing at one side of the abutment.

The vibrator $a$ is of the usual cup-shaped form, made of soft rubber and screwed on to the end of the tube $b$. It is applied to the fleshy parts to be treated in the usual manner. The tube $b$ is in direct communication with the interior of the casing $c$ at one side of the abutment $e$. The casing $c$ is provided at the side opposite to the abutment $e$ with an air-nipple $d^1$. The abutment $e$ is formed of a flat portion $e^1$ which extends through an opening $o$ into the casing, and a cylindrical portion $e^2$ which is guided in the socket $d$ and provided with a shank $e^3$ around which a helical cushioning spring $f$ is placed, the spring being interposed between the shoulder formed by the shank $e^3$ with the cylindrical portion $e^2$ and the cap $e^4$ of the socket. The casing is further provided at a suitable point with a handle (not shown) by which the same is held when it is applied for use.

When the improved massage apparatus is to be used, the vibrator is applied in the usual manner to the part to be treated. The motor is then started and the piston quickly rotated in the casing. Owing to the rotation of the piston and the reciprocation of the abutment the vibrator will then impart to the fleshy parts to be treated the usual quick blows, and simultaneously therewith it will exert by the quick rotations of the piston alternately, a suction-action for raising the fleshy parts and a release action by which they are permitted to return to their normal position. At each full rotation of the piston the air in the cup-shaped vibrator is gradually exhausted until the piston has passed the air-nipple and returned to its starting position, when the atmospheric air enters into the space between the casing and piston and interrupts thereby the suction-action on the fleshy part. As soon as the rotation of the piston having the greatest degree of eccentricity passes beyond the abutment, the gradually-increasing suction-action commences, as shown in Figs. 5, 6 and 7, so that the fleshy parts are quickly raised, which is then followed up by the quick release of the parts at the moment when the piston moves past the air-nipple as shown in Fig. 4, whereby a pneumatically-operated massage is imparted to the parts to be treated, in addition to the quick blows given by the vibrator. By the combined action of the vibrator giving quick strokes or blows to and the suction and release action exerted by the piston, on the fleshy parts, a superior massage-action is obtained. The apparatus is small, can be conveniently held by one hand and produces a very effective and novel massage-action on the parts to be treated. Slight changes may be made without departing from the spirit of my invention.

Having thus described my invention, I claim as new and desire to secure by Letters Patent:

1. A massage apparatus comprising a portable casing, a massage member thereon having an air-opening in communication with the casing, a rotary eccentric piston in said casing for vibrating the casing and massage member; and also simultaneously intermittently suctioning air through the air opening.

2. In a massage apparatus, the combination, of a casing, a vibrator thereon having an air passage communicating with the interior of the casing, and an abutment in the casing, with a rotary eccentric piston causing intermittent suction action through the air passage of the vibrator, and simultaneously causing its vibration.

3. In a massage-apparatus, having a portable casing and a massage-member with an air-passage in direct communication with the interior of the casing, single suctioning and vibrating means located in the interior of the casing for simultaneously vibrating the massage-member and causing an intermittent suction through the massage-member and into that part of the interior of the casing in which said means are located.

In testimony, that I claim the foregoing as my invention, I have signed my name in presence of two subscribing witnesses.

HENRY GINNEL.

Witnesses:
   PAUL GOEPEL,
   HENRY J. SUHRBIER.